United States Patent Office 2,766,554
Patented Oct. 16, 1956

2,766,554
METHOD OF STERILIZING SOIL

Stephen C. Dorman and August B. Lindquist, Jr., Mountain View, Calif., assignors to Stauffer Chemical Company, a corporation of Delaware No Drawing. Application July 28, 1954,
Serial No. 446,406

9 Claims. (Cl. 47—58)

This invention relates to a soil treatment and particularly relates to a method of temporarily sterilizing soil. In many instances, it is desirable to treat a bed where seeds are to be planted with a compound which will completely kill any plant or animal life existing in the bed and yet will disappear in a short time so that the bed can be planted with the seeds of some useful plant. Materials previously available are unsuited either because they are ineffective, leave harmful residues in the soil, or are hazardous to use.

In accordance with the present invention, it has been found that compounds possessing the formula:

wherein R is a methyl or ethyl radical, and M is an alkali metal, an alkaline earth metal, or an ammonium radical, can be applied to soil whereupon substantially all plant and animal life in the soil is killed, yet the soil is ready for planting within two or three days after the application. The compounds of the present invention are particularly advantageous since they exert a fumigating effect and in solution may be merely sprinkled upon the surface of the soil and yet will have an effect throughout several inches in depth of the soil. As shown below, there are a number of related commercial compounds used for other than soil treatment and although they are outstanding elsewhere, they are practically useless for the control of weeds and organism in the soil.

In the above formula, R was said to be a methyl or an ethyl radical and, in accordance with the present invention, the methyl radical is preferred. Although this invention is not predicated on any theory of its operation, it is believed that dithiocarbamates having more than one substitution on the nitrogen, or having a single substituent on the nitrogen having more than two carbons, form compounds which are too large to readily pass through the soil. In any event, as later experimental evidence shows, compounds having more than one substituent on the nitrogen radical, or having a substituent of more than two carbon atoms on the nitrogen atom, are substantially worthless for purposes of the present invention.

One outstanding property of the compounds of the present invention is that they are highly water soluble and stable when in relatively concentrated form. However, when the compounds of the present invention are sprayed on soil, or otherwise diluted, they break down rapidly, losing their killing properties. It is for this reason that these highly toxic compounds can be applied to soil and yet the soil planted to a useful crop within a few days.

One particularly attractive feature of the compounds of the present invention is that they are substantially nonselective in their action. Thus, plants as well as seeds of both broad-leaf and narrow-leaf plants are killed, as well as fungi, insects, nematodes, various worms and the like.

The following working examples show various methods of utilizing the compounds of the present invention.

Example 1.—Water representing a depth of six inches and containing 100 parts per million of sodium N-methyl dithiocarbamate was applied to a field infested with wireworm larvae (Limonius californicus). Seven days after application, sugar beet seeds were planted and the beets grew normally without wireworm damage. In similar soil, when beet seeds were planted without the prior treatment, there was evidence of severe damage from natural causes.

Example 2.—A series of sealed quart glass jars was filled with soil infested with the larval forms of the rootknot nematode, Meloidogyne species. Various concentration of compounds, falling within and without the scope of the present invention were applied to the soil to build up various concentrations of the compound in the soil. The jars were subsequently examined for evidence of live larval forms. It was found that sodium N-methyl dithiocarbamate killed all forms at 5 p. p. m., and that sodium N-ethyl dithiocarbamate killed 20 p. p. m. On the other hand, sodium N,N-dimethyl dithiocarbamate did not kill at 160 p. p. m., nor did sodium N-diethyl dithiocarbamate or tetramethyl thiuram disulfide at this concentration.

Example 3.—Screened and sterilized soil in glass jars containing fungus cultures of Armillaria mellea on apricot sticks, Verticilium alboatrum on tomato stems and sclerotia of Sclerotium rolfsii were treated with N-methyl dithiocarbamate and sealed for 48 hours and inspected for growth. The following results were obtained:

| Organism | Concentration in p. p. m. | | | |
|---|---|---|---|---|
| | 15 | 10 | 5 | 1 |
| Sclerotium rolfii | − | − | − | + |
| Armillaria mellea | − | − | + | + |
| Verticilium albo atrum | − | + | − | + |

(− = no growth; + = growth.)

Example 4.—Water solutions of salts of N-methyl and N,N-dimethyl dithiocarbamic acid were applied as drenches to soil in which well established morning glory was growing. Morning glory is a very deep-rooted plant and ordinarily difficult to eradicate. The drenches were applied in equal concentrations in each instance amounting to 75 pounds of active compound per acre. It was found that sodium N,N-dimethyl dithiocarbamate gave no kill, while excellent kills were obtained with methylammonium N-methyl dithiocarbamate, sodium N-methyl dithiocarbamate, potassium N-methyl dithiocarbamate, and calcium N-methyl dithiocarbamate.

Example 5.—Glass columns were filled with soil which contained oat seeds. The glass columns were 30″ high and were made of 3″ sections of 51 mm. glass tubing, the sections being joined with plastic tape. The columns were fumigated by injecting 6″ from the top of each column, 1 ml. of a water solution containing 0.1 gram of the chemical under test. After 48 hours, the columns were cut apart and soil from each 3″ section was planted in a clay pot. The germination of the oat seeds from each section showed the distance, if any, from the site of injection for which the compound was effective. In the case of methylammonium N-methyl dithiocarbamate, control was exercised to the top of the column and throughout the first four sections. In the case of sodium N-methyl dithiocarbamate, control was exercised through the top six sections, as was the case with potassium N-methyl dithiocarbamate. However, with sodium N,N-dimethyl dithiocarbamate, there was no control in any section. These tests conclusively show the definite fumigating effects of the N-methyl compounds in soil as contrasted with the inability of the N,N-dimethyl compounds to penetrate through the soil. Further, in those sections of the column which had shown 100% kill of the oat seeds, the soil was allowed to stand in the open for forty-eight hours, and then replanted with oats. In each case, the seeds germinated normally after the 48 hour delay.

*Example 6.*—The herbicidal properties of five sodium dithiocarbamates were compared by spraying heavily on the surface of soil in pots with 0.1% water solutions. These were applied as post- and pre-emergence sprays on oat and radish seeds with the following per cent control:

| Substituted sodium dithiocarbamate | Percent Control | | | |
|---|---|---|---|---|
| | Post-Emergence | | Pre-Emergence | |
| | Oat | Radish | Oat | Radish |
| N-methyl | 100 | 100 | 100 | 100 |
| N-ethyl | 100 | 30 | 50 | 50 |
| N,N-diethyl | 0 | 0 | 0 | 0 |
| N-isopropyl | 0 | 0 | 0 | 0 |
| N,N-dimethyl | 0 | 0 | 0 | 0 |

This experiment illustrates the following (*a*) for soil applications, the N-monoalkyl dithiocarbamates are much superior to the N,N-dialkyl dithiocarbamates, and (*b*) an ethyl group is the largest group that can be substituted without a substantial loss in ability to penetrate soil and/or kill plants and seeds.

*Example 7.*—To demonstrate the temporary nature of the soil sterilizing property of the compounds of the present invention, three different types of soil were treated with a dosage of sodium N-methyl dithiocarbamate equivalent to 200 pounds per acre, and oat seeds were planted at intervals thereafter to observe germination. In the case of sandy loam, seeds planted two days after the treatment emerged normally. In the case of medium clay loam and heavy clay loam, seeds planted one day after application emerged normally.

*Example 8.*—The sodium N-methyl dithiocarbamate was compared with the outstanding prior art compounds and the most effective commercial materials of somewhat similar chemical composition to compare their effectiveness against the root-knot nematode of the genus *Meloidogyne*. The soil employed in the test was a dark-colored sandy loam of uniform texture. Heavy infestations of nematodes were developed and maintained on tomato plants. Inoculation of the test soil was accomplished by intimately mixing a weighed quantity of heavily infested soil and chopped tomato roots with twice its weight of clean soil. 600 grams of the infested soil mixture was weighed into a one-quart jar and a depression of 2″ was made in the soil in each jar with the bottom of the 2 cc. test tube. The hole was filled with about 22 grams of dry sand and the compound under test was dripped into the sand. For the purpose of the present test, the quantity of compound injected was selected to give a concentration in the soil of either 5 p. p. m. or 160 p. p. m. After the sand in each jar had been treated with the desired compound, the jar was immediately sealed and shaken to distribute the sand core throughout the culture. The cultures were then held for 48 hours at 80–85° F., and after 48 hours, each culture was transferred from the jar to a 4½″ clay pot and placed in a greenhouse. Five days thereafter, tomato seedlings were transplanted into each pot and watered for 20 to 30 days. The plants were then removed from the pot, the roots washed free of adhering soil, and compared with the roots of similar plants grown in infested but untreated soil. The degree of infection was determined by observing knots on the roots of the plants. Those tests in which there was no visible difference between the control and the treated plants were graded zero, and those in which there had been complete control were graded 100. In this test, it was found that sodium N-methyl dithiocarbamates gave 100% control at 5 p. p. m., but that the outstanding following compounds from the prior art gave no observable control at 160 p. p. m., namely:

Tetramethyl thiuram disulfide
Ferric dimethyl dithiocarbamate
Sodium ethylene bis-dithiocarbamate
Zinc ethylene bis-dithiocarbamate
Manganese ethylene bis-dithiocarbamate
42% solution of sodium dimethyl dithiocarbamate
Sodium diethyl dithiocarbamate.

The compounds of the present invention may be applied to soil in a variety of forms, but since the compounds are readily soluble in water, it is ordinarily preferred to apply the compounds with an aqueous carrier. Further, since relatively concentrated solutions of the compounds are stable, it is quite practical to ship and store solutions containing from one to five pounds per gallon of the compound in water, and to further dilute the compound just before application. The compounds should be applied at rates varying from about 50 to about 800 pounds of active ingredient per acre. Under most normal conditions, application at the rate of about 100 pounds per acre will be found satisfactory. Since the compounds, as pointed out above, have considerable fumigating action and are able to thus travel through the soil, it is ordinarily sufficient to merely apply the compound and carrier to the surface of the soil.

However, it is sometimes desirable to rake or disc or otherwise cultivate the compounds into the top few inches of soil. The compounds may also be applied in others ways such as placing behind a plow, injection of solutions, addition to irrigation water, or standing water such as in a rice paddy, and the like.

Other soil factors may be controlled also since we have noticed improvement in growth of plants following application to soil which was not known to have harmful organisms in it.

We claim:

1. The method of temporarily sterilizing soil comprising applying to the soil a compound in a quantity sufficient to sterilize the soil of the formula:

wherein R is a member chosen from the group consisting of the ethyl and methyl radicals and M is chosen from the group consisting of alkali metals, alkaline earth metals, and ammonium radicals.

2. The process of claim 1 wherein the compound is applied to the soil as a drench.

3. The process of claim 1 wherein the compound is applied to the soil at a rate of from 50 to 800 pounds per acre.

4. The method of temporarily sterilizing soil comprising applying to the soil sodium N-methyl dithiocarbamate in a quantity sufficient to sterilize the soil.

5. The method of temporarily sterilizing soil comprising applying to the soil ammonium N-methyl dithiocarbamate in a quantity sufficient to sterilize the soil.

6. The method of temporarily sterilizing soil comprising applying to the soil methylammonium N-methyl dithiocarbamate in a quantity sufficient to sterilize the soil.

7. The method of temporarily sterilizing soil comprising applying to the soil potassium N-methyl dithiocarbamate in a quantity sufficient to sterilize the soil.

8. The method of temporarily sterilizing soil comprising applying to the soil calcium N-methyl dithiocarbamate in a quantity sufficient to sterilize the soil.

9. The method of agriculture comprising applying to the soil a compound in a quantity sufficient to sterilize the soil of the formula:

$$R-NH\overset{\underset{\|}{S}}{C}S-M$$

wherein R is a member chosen from the group consisting of the ethyl and methyl radicals and M is chosen from the group consisting of alkali metals, alkaline earth metals, and ammonium radicals, permitting the soil to stand for a few days and planting a crop in said soil.

References Cited in the file of this patent

FOREIGN PATENTS

8103/32     Australia _____ July 4, 1932

OTHER REFERENCES

Frear: "Chemical Insecticides, Fungicides and Herbicides," 2nd edition (1948), pp. 263–265.

"Chemical Abstracts," vol. 46 (1952), col. 524g, abstract of article by Klopping et al.